US012455310B2

(12) United States Patent
Iyama et al.

(10) Patent No.: US 12,455,310 B2
(45) Date of Patent: Oct. 28, 2025

(54) FAULT DETECTION CIRCUIT

(71) Applicant: TOYOTA JIDOSHA KABUSHIKI KAISHA, Toyota (JP)

(72) Inventors: Hiroyuki Iyama, Okazaki (JP); Yu Sasaki, Kashiwa (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 198 days.

(21) Appl. No.: 18/484,179

(22) Filed: Oct. 10, 2023

(65) Prior Publication Data
US 2024/0151760 A1    May 9, 2024

(30) Foreign Application Priority Data
Nov. 8, 2022   (JP) ................................. 2022-178696

(51) Int. Cl.
G01R 29/16     (2006.01)
G01R 29/02     (2006.01)
H02P 29/024    (2016.01)
H02P 7/00      (2016.01)

(52) U.S. Cl.
CPC .......... *G01R 29/16* (2013.01); *G01R 29/023* (2013.01); *H02P 29/024* (2013.01); *H02P 7/00* (2013.01)

(58) Field of Classification Search
None
See application file for complete search history.

(56) References Cited

U.S. PATENT DOCUMENTS

| 11,456,692 | B2 * | 9/2022 | Aoki ..................... H02P 29/028 |
| 2015/0369852 | A1 | 12/2015 | Mitsuda et al. |
| 2024/0142505 | A1 * | 5/2024 | Fu ......................... H02P 29/024 |

FOREIGN PATENT DOCUMENTS

| CN | 107408904 A | * | 11/2017 | ................ H02P 6/18 |
| CN | 109075734 A | * | 12/2018 | .......... H02P 29/0241 |
| CN | 111948574 A | * | 11/2020 | ....... G01R 19/16576 |
| EP | 3544175 A1 | * | 9/2019 | ............ H02P 29/024 |
| JP | H08-149877 A |  | 6/1996 | |
| JP | 2000-358376 A |  | 12/2000 | |
| JP | 2016-010179 A |  | 1/2016 | |
| JP | 2021-184668 A |  | 12/2021 | |

* cited by examiner

*Primary Examiner* — Richard Isla
(74) *Attorney, Agent, or Firm* — Oliff PLC

(57) ABSTRACT

A fault detection circuit according to the present disclosure includes a rectangular pulse comparison circuit configured to generate, for each combination of the pulse width modulated signals, detection signals each indicating a difference component between pulse widths of two pulse width modulated signals having phases adjacent to each other, and a fault diagnosis unit configured to detect a fault in an inverter based on a shift in a combination of logic levels of a plurality of the detection signals output by the rectangular pulse comparison circuit from a preset determination value. The fault diagnosis unit uses the determination value that is different for each motor rotation angle assuming in advance that two alternating-current signals having phases adjacent to each other among the three-phase alternating-current signals have the same voltage.

4 Claims, 16 Drawing Sheets

15

|  | DETERMINATION VALUE DV(30°) | DETERMINATION VALUE DV(90°) | DETERMINATION VALUE DV(150°) | DETERMINATION VALUE DV(210°) | DETERMINATION VALUE DV(270°) | DETERMINATION VALUE DV(330°) |
|---|---|---|---|---|---|---|
| UVm | LOW=NORMAL HIGH=ABNORMAL |  |  | LOW=NORMAL HIGH=ABNORMAL |  |  |
| VWm |  | LOW=NORMAL HIGH=ABNORMAL |  |  | LOW=NORMAL HIGH=ABNORMAL |  |
| WUm |  |  | LOW=NORMAL HIGH=ABNORMAL |  |  | LOW=NORMAL HIGH=ABNORMAL |

Fig. 6

FAULT DETECTION CIRCUIT

CROSS REFERENCE TO RELATED APPLICATIONS

This application is based upon and claims the benefit of priority from Japanese patent application No. 2022-178696, filed on Nov. 8, 2022, the disclosure of which is incorporated herein in its entirety by reference.

BACKGROUND

The present disclosure relates to a fault detection circuit that detects a fault in an inverter that outputs a three-phase alternating-current signal for driving a motor.

One of motor drive systems is a three-phase drive system in which a motor is controlled by three-phase alternating-current signals. In this three-phase drive system, a PWM signal is output by an inverter and an average voltage of the PWM signal is used as an alternating-current signal. In addition, in the three-phase drive system, it is important that a phase difference between drive signals and amplitudes of the drive signals are maintained at preset values. In order to achieve this, a method for inspecting signals output by an inverter in the three-phase drive system is disclosed in Japanese Unexamined Patent Application Publication No. 2021-184668.

The motor drive apparatus described in Japanese Unexamined Patent Application Publication No. 2021-184668 includes an inverter for supplying alternating-current power to a three-phase brushless motor, a shunt resistor connected in series between a lower arm of each phase of the inverter and ground, a first detection circuit for detecting a potential difference between both ends of the shunt resistor, a second detection circuit for detecting the potential difference between both ends of the shunt resistor, a third detection circuit for detecting the potential difference between both ends of the shunt resistor, and an control unit for inputting an output of the first detection circuit, an output of the second detection circuit, and an output of the third detection circuit to control the inverter. The control unit compares the output of the first detection circuit, the output of the second detection circuit, and the output of the third detection circuit to determine which of the first detection circuit, the second detection circuit, and the third detection circuit is out of order, and controls the inverter based on the output of the detection circuit other than the one determined to be out of order among the first detection circuit, the second detection circuit, and the third detection circuit. The control unit described in Japanese Unexamined Patent Application Publication No. 2021-184668 also includes a first analog-to-digital conversion circuit for analog-to-digital conversion of the output of the first detection circuit and the output of the second detection circuit, and a second analog-to-digital conversion circuit for analog-to-digital conversion of the output of the second detection circuit and the output of the third detection circuit.

SUMMARY

However, in an inverter used in a three-phase drive system, a frequency of a carrier signal (e.g., PWM signal) is generally set higher than that of the three-phase alternating-current signal (e.g., about 20 kHz) to suppress current ripple. When this carrier signal is sampled, the signal needs to be sampled and processed at a frequency sufficiently higher than that of the carrier signal (e.g., 2 MHz). In Japanese Unexamined Patent Application Publication No. 2021-184668, analog-to-digital conversion is performed on a three-phase alternating-current signal, and a fault in the inverter is detected based on a value obtained by the analog-to-digital conversion. Therefore, the motor drive apparatus described in Japanese Unexamined Patent Application Publication No. 2021-184668 requires the use of a Micro Controller Unit (MCU) capable of operating at a high frequency to detect a fault, which causes an increase in current consumption.

The present disclosure has been made in view of the above circumstances, and proposes a fault detection circuit capable of detecting a fault in an inverter with a small amount of arithmetic processing.

A fault detection circuit according to the present disclosure detects a fault in an inverter that outputs a three-phase pulse width modulated signal that becomes a three-phase alternating-current signal for driving a motor. The fault detection circuit includes: a rectangular pulse comparison circuit configured to generate, for each combination of the pulse width modulated signals, a detection signal indicating a difference component between pulse widths of two of the pulse width modulated signals having phases adjacent to each other; and a fault diagnosis unit configured to detect a fault in the inverter based on a shift in a combination of logic levels of a plurality of the detection signals output by the rectangular pulse comparison circuit from a preset determination value. The fault diagnosis unit uses the determination value that is different for each motor rotation angle assuming in advance that two alternating-current signals having phases adjacent to each other among the three-phase alternating-current signals have the same voltage.

The fault detection circuit according to the present disclosure compares the combinations of the presence or absence of differences in pulse widths of the pulse width modulation signals with the determination value set for each motor rotation angle.

According to the present disclosure, it is possible to detect an abnormality in an inverter by an arithmetic apparatus with low processing power.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 6 is a table describing a determination value applied to a fault diagnosis unit according to the first embodiment;

DESCRIPTION OF EMBODIMENTS

The present disclosure will be described below through the embodiments of the disclosure, but the disclosure set forth in the claims is not limited to the following embodiments. Moreover, not all of the configurations described in the embodiment are essential as means to solve the problem. The embodiments will be described below with reference to the drawings.

First Embodiment

Figure 1:
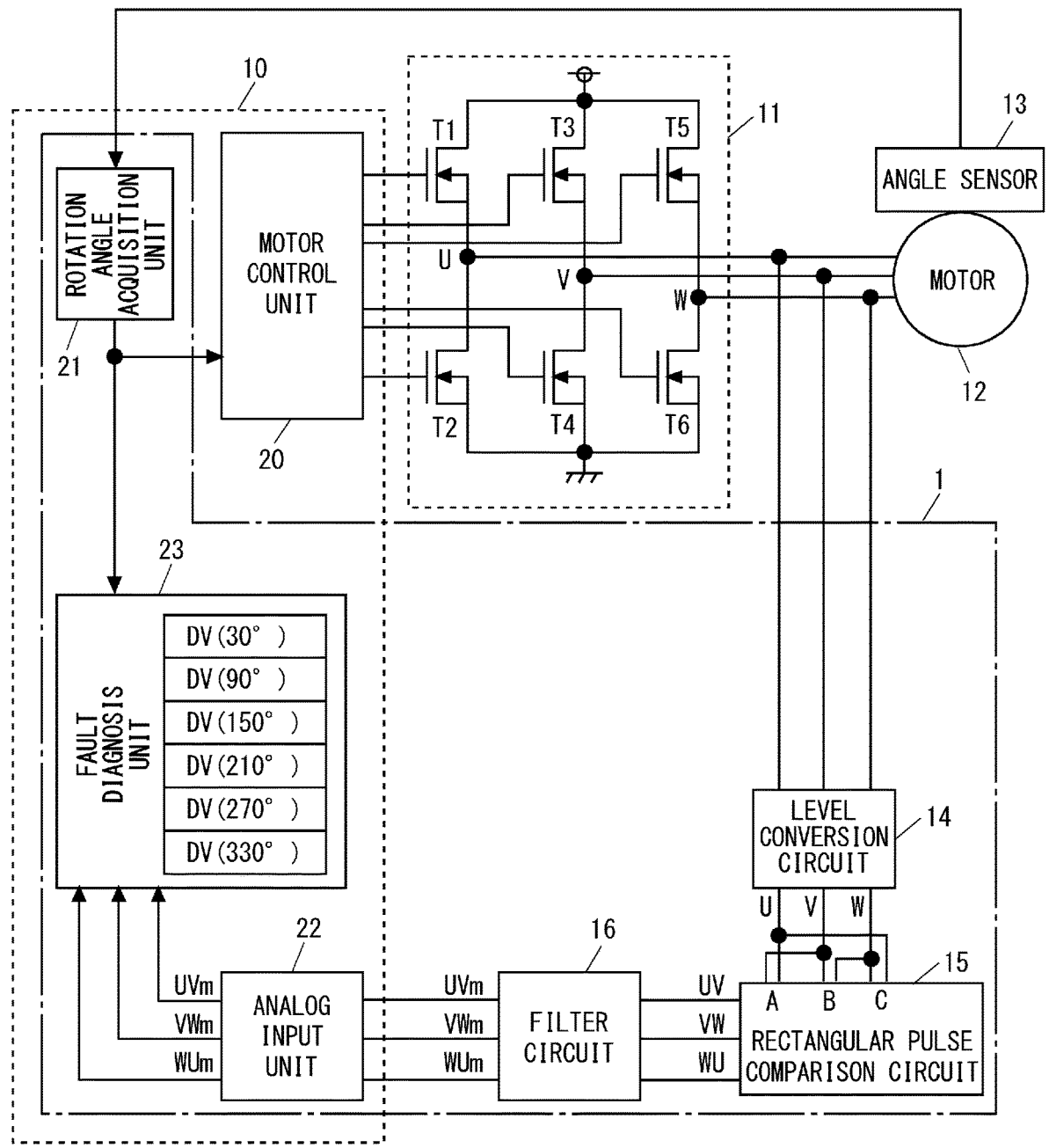
FIG. 1 is a block diagram of a motor drive apparatus according to a first embodiment.

First, FIG. 1 is a block diagram of a motor drive apparatus according to a first embodiment. The motor drive apparatus according to the first embodiment varies a frequency and a pulse width of a drive signal according to a rotation angle and a speed command value (not shown) of a motor 12 by means of a Micro Controller Unit (MCU) 10, and generates a three-phase alternating-current signal to drive the motor by giving the drive signal to the inverter 11. Here, the MCU10 is a semiconductor apparatus that includes, for example, an arithmetic unit capable of executing a program, a PWM (Pulse Width Modulation) processing unit that generates a PWM (Pulse Width Modulation) signal serving as the drive signal, a digital input interface, an analog input interface, a timer, and various other processing units.

The fault detection circuit 1 according to the first embodiment is incorporated into a part of the motor drive apparatus shown in FIG. 1. Specifically, a part of the fault detection circuit 1 is implemented using the functions of the MCU10. Therefore, in the following explanation, the entire motor drive apparatus according to the first embodiment is described, and then the fault detection circuit 1 is described in detail.

As shown in FIG. 1, the motor drive apparatus according to the first embodiment includes the MCU10, an inverter 11, a motor 12, an angle sensor 13, a level conversion circuit 14, a rectangular pulse comparison circuit 15, and a filter circuit 16. The MCU10 has a motor control unit 20, a rotation angle acquisition unit 21, an analog input unit 22, and a fault diagnosis unit 23.

The motor control unit 20 varies a frequency and a pulse width of the drive signal given to the inverter 11 according to a rotation angle of the motor 12 acquired by the rotation angle acquisition unit 21 and a speed command value given by an upper system (not shown). The motor control unit 20 is implemented using an arithmetic function, a PWM processing unit, a timer, etc.

The inverter 11 generates a three-phase alternating-current signal from a power supply provided by direct current. Specifically, the inverter 11 has a first inverter that generates U-phase alternating-current signals, a second inverter that generates V-phase alternating-current signals, and a third inverter that generates W-phase alternating-current signals. The first to third inverters generate three-phase alternating-current signals whose phases differ by 120 degrees from the drive signal output by the motor control unit 20.

The first inverter has transistors T1 and T2 connected in series between power supply wiring and ground wiring. The first inverter outputs U-phase alternating-current signals from a node where the transistors T1 and T2 are connected. The second inverter has transistors T3 and T4 connected in series between the power supply wiring and the ground wiring. The second inverter outputs V-phase alternating-current signals from a node where the transistors T3 and T4 are connected. The third inverter has transistors T5 and T6 connected in series between the power supply wiring and the ground wiring. The third inverter outputs W-phase alternating-current signals from a node where the transistors T5 and T6 are connected.

In the inverter 11, each of the first to third inverters outputs a PWM (Pulse Width Modulation) signal whose duty ratio changes according to a pulse width of the drive signal output by the motor control unit 20. An average voltage of the PWM signal output by each inverter within a predetermined period changes with time. That is, the average voltage of the PWM signal output by each inverter within a predetermined period becomes the alternating-current signal.

The motor 12 is a three-phase alternating-current motor. The motor 12 includes an angle sensor 13. The angle sensor 13 detects a rotation angle of the motor 12 and outputs detected rotation angle information about the motor 12. This rotation angle information is transmitted to the rotation angle acquisition unit 21 for use in processing in the MCU10.

The level conversion circuit 14 converts an amplitude of the PWM signal corresponding to each phase that becomes a three-phase alternating-current signal to a logic level (e.g., amplitude of about 3.3 V or 5.0 V). The rectangular pulse comparison circuit 15 generates a detection signal indicating a difference component between the pulse widths of the two PWM signals whose phases are adjacent to each other for each combination of the PWM signals. More specifically, the rectangular pulse comparison circuit 15 outputs a difference component between the pulse width of the U-phase PWM signal and that of the V-phase PWM signal as a detection signal UV, a difference component between the pulse width of the V-phase PWM signal and that of the W-phase PWM signal as a detection signal VW, and a difference component between the pulse width of the W-phase PWM signal and that of the U-phase PWM signal as a detection signal WU.

Figure 2:
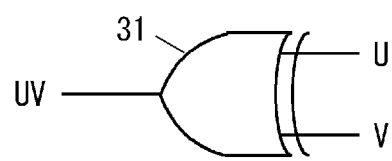
FIG. 2 is a circuit diagram of a rectangular pulse comparison circuit according to the first embodiment.
Figure 2:
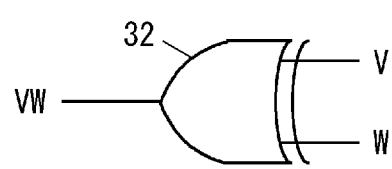
Figure 2:
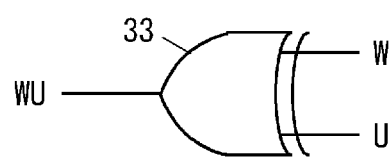

Here, an example of a specific circuit of the rectangular pulse comparison circuit 15 will be described. FIG. 2 is a circuit diagram of the rectangular pulse comparison circuit 15 according to the first embodiment. As shown in FIG. 2, the rectangular pulse comparison circuit 15 has exclusive OR circuits 31 to 33. The exclusive OR circuit 31 outputs a result of an exclusive OR operation of the U-phase PWM signal and the V-phase PWM signal as the detection signal UV. The exclusive OR circuit 32 outputs a result of an exclusive OR operation of the V-phase PWM signal and the W-phase PWM signal as the detection signal VW. The exclusive OR circuit 33 outputs a result of an exclusive OR operation of the W-phase PWM signal and the U-phase PWM signal as the detection signal WU.

The filter circuit 16 smooths each of the plurality of detection signals (e.g., detection signals UV, VW, and WU) and transmits the smoothed detection signals to the analog input unit 22 in the motor control unit 20. More specifically, each of the plurality of detection signals is a pulse wave, and the filter circuit 16 outputs a direct-current voltage having an average voltage within a predetermined period of time of the plurality of detection signals. This direct-current voltage can be regarded as a direct-current voltage in a predetermined period of time, and the voltage fluctuates in a long time beyond the predetermined period of time.

Figure 3:
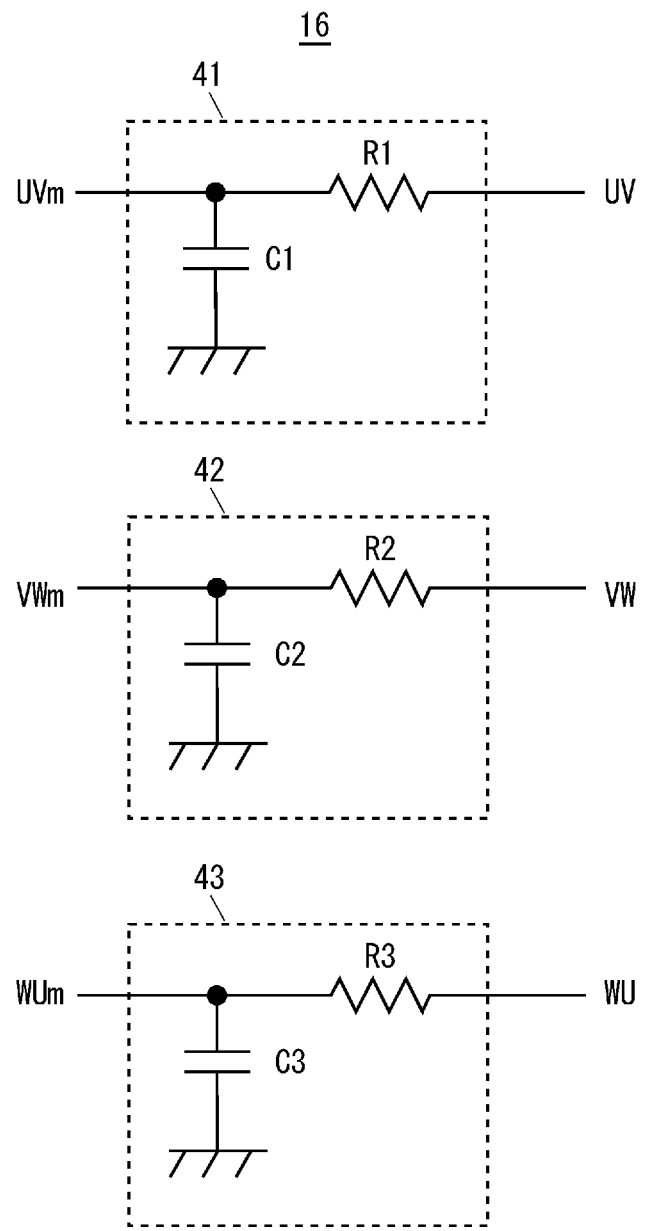
FIG. 3 is a circuit diagram of a filter circuit according to the first embodiment.

Here, an example of a specific circuit of the filter circuit 16 will be described. FIG. 3 shows a circuit diagram of the filter circuit 16 according to the first embodiment. As shown in FIG. 3, the filter circuit 16 has unit filter circuits 41 to 43. The unit filter circuits 41 to 43 are first-order low-pass filters each composed of a resistor inserted on a signal transmission line and a capacitor provided between wiring on an output side of the resistor and the ground wiring. The unit filter circuit 41 smooths the detection signal UV and then outputs a monitor signal UVm. The unit filter circuit 42 smooths the detection signal VW and then outputs a monitor signal VWm. The unit filter circuit 43 smooths the detection signal WU and then outputs a monitor signal WUm.

The analog input unit 22 evaluates a voltage level of each of the plurality of monitor signals (e.g., the monitor signals UVm, VWm, WUm), and if the monitor signal is greater than or equal to a threshold value (a voltage level that can be recognized as a high-level logic level), the analog input unit 22 transmits a high-level monitor signal to the fault diagnosis unit 23, whereas if the monitor signal is lower than the threshold value (a voltage level that can be recognized as a low-level logic level), the analog input unit 22 transmits a low-level monitor signal to the fault diagnosis unit 23.

The fault diagnosis unit 23 detects that the inverter 11 has failed based on a shift in the combination of the logic levels of the plurality of detection signals output by the rectangular pulse comparison circuit 15 from a preset determination value DV. At this time, the fault diagnosis unit 23 uses a determination value DV different for each motor rotation angle assuming in advance that two alternating-current signals whose phases are adjacent to each other among the three-phase alternating-current signals have the same voltage. Details of this determination value DV will be described later.

The rotation angle acquisition unit 21 transmits the motor rotation angle information acquired from the angle sensor 13 to the motor control unit 20 and the fault diagnosis unit 23. The fault diagnosis unit 23 switches the determination value DV used for an evaluation reference based on the motor rotation angle information transmitted from the rotation angle acquisition unit 21.

In the above description, the fault detection circuit 1 according to the first embodiment is composed of the level conversion circuit 14, the rectangular pulse comparison circuit 15, the filter circuit 16, the rotation angle acquisition unit 21, the analog input unit 22, and the fault diagnosis unit 23. It is also possible to delete the filter circuit 16 and change the analog input unit 22 to an analog input unit that samples a digital signal, or change the analog input unit 22 to a counter that counts rising edges of pulses. In this case, the counter counts the number of pulses of the plurality of output signals output by the rectangular pulse comparison circuit 15, and the fault diagnosis unit 23 detects a fault in the inverter 11 by comparing a combination of count values for each detection signal with the determination value.

Figure 4:
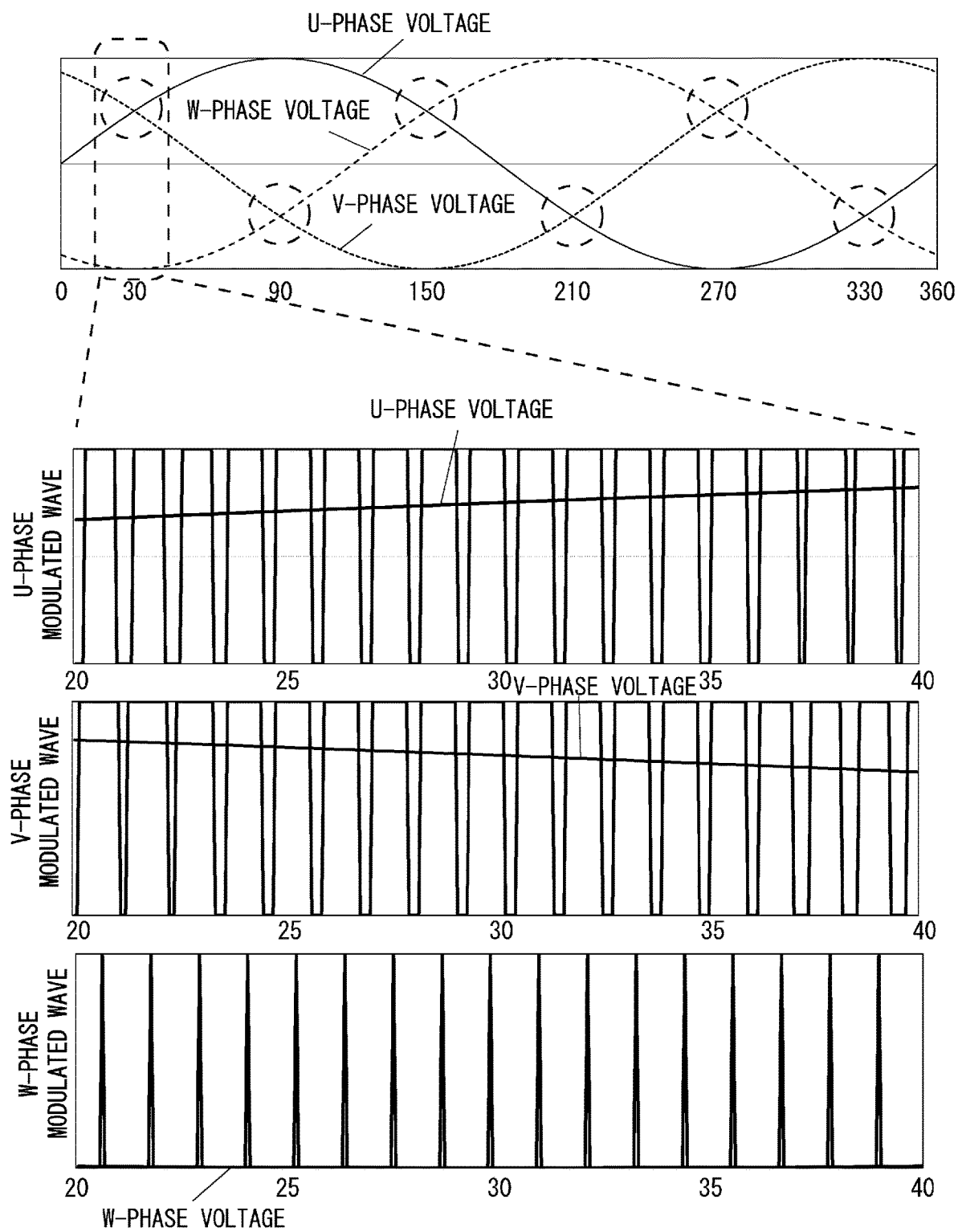
FIG. 4 is a timing chart of a modulated wave output by an inverter when a three-phase alternating-current signal is normal.

Next, an operation of the fault detection circuit 1 is described. First, the PWM signal used for the evaluation by the fault detection circuit 1 is described. FIG. 4 is a timing chart of a modulated wave (e.g., PWM signal) output by the inverter 11 when the three-phase alternating-current signal is normal. FIG. 4 is the timing chart of the three-phase alternating-current signals output by the inverter 11 and the U-phase, V-phase, and W-phase PWM signals around the motor rotation angle of 30 degrees.

As shown in FIG. 4, the three-phase alternating-current signal includes the U-phase, V-phase, and W-phase alternating-current signals, each with a phase difference of 120 degrees. Also, each alternating-current signal has a fluctuation of one period during one rotation (0 to 360 degrees) of the motor. Therefore, in the three-phase alternating-current signal, the voltages of the U-phase and V-phase alternating-current signals become the same at the motor rotor angles of 30 degrees and 210 degrees, the voltages of the V-phase and W-phase alternating-current signals become the same at the motor rotor angles of 90 degrees and 270 degrees, and the voltages of the W-phase and U-phase alternating-current signals become the same at the motor rotor angles of 150 degrees and 330 degrees.

Also, the pulse width of the PWM signal output to generate the three-phase alternating-current signal changes in such a way that the higher the voltage of the alternating-current signal, the larger the duty ratio, whereas the lower the voltage of the alternating-current signal, the smaller the duty ratio. Here, FIG. 4 shows an enlarged PWM signal with the motor rotation angle around 30 degrees. Referring to this enlarged drawing (the lower drawing of FIG. 4), the PWM signals have the same frequency and phase with each other and a pulse width variation pattern according to the phase of the corresponding alternating-current signal. Moreover, when the voltage of the alternating-current signal is the same, the duty ratios of the PWM signals are almost the same. The fault detection circuit 1 according to the first embodiment uses these characteristics of the PWM signal to detect an abnormality in the inverter 11.

Figure 5:
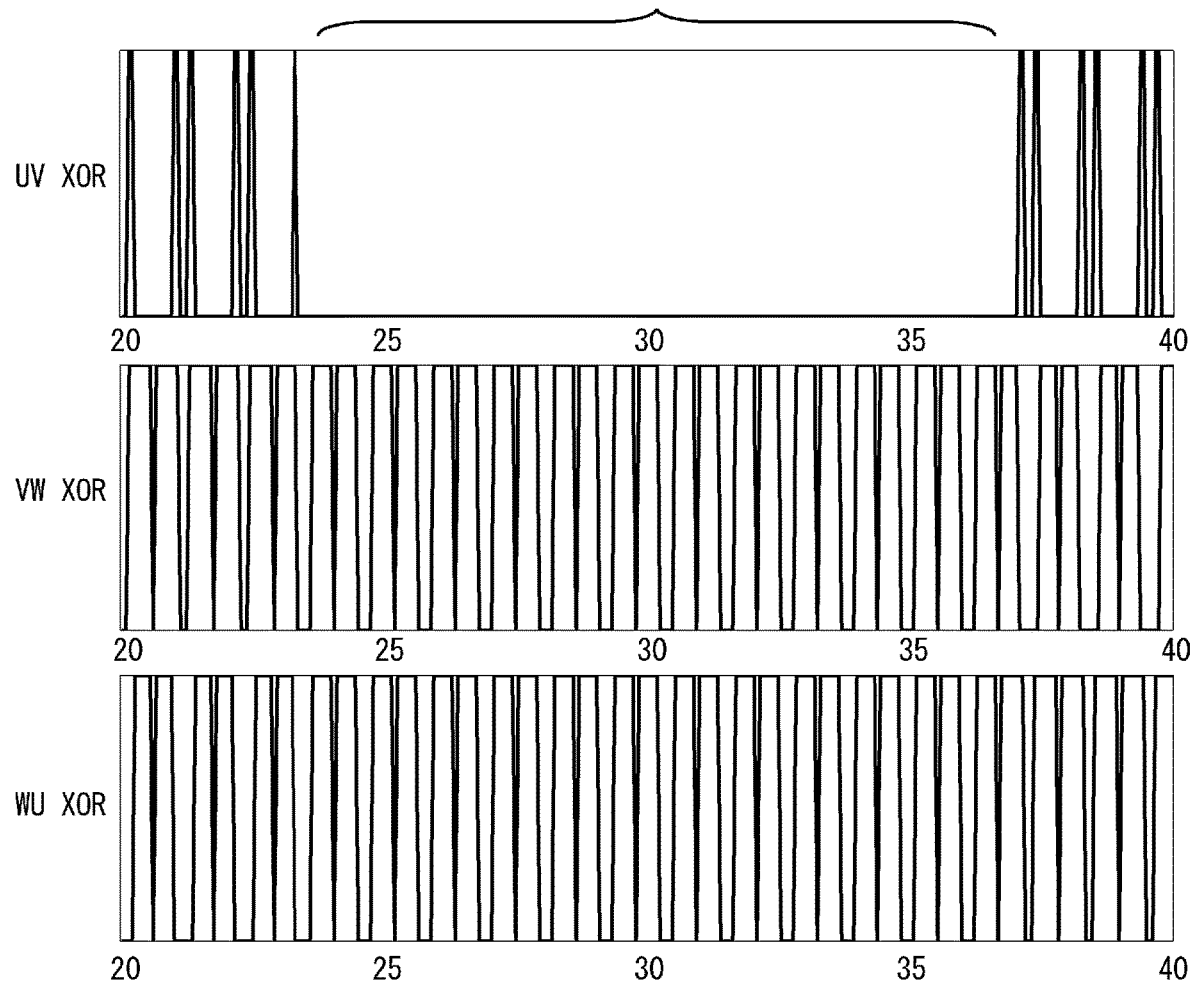
FIG. 5 is a timing chart describing an operation of the rectangular pulse comparison circuit when the three-phase alternating-current signal is normal.

Next, FIG. 5 is a timing chart describing an operation of the rectangular pulse comparison circuit 15 when the three-phase alternating-current signal is normal. FIG. 5 is the timing chart of the detection signal output by the rectangular pulse comparison circuit 15 when the motor rotation angle is around degrees. As shown in FIG. 5, since the inverter 11 is normal and the pulse widths of the U-phase and V-phase PWM signals are almost the same when the motor rotation angle is around 30 degrees, the detection signal UV, which is a result of the exclusive OR operation of the U-phase PWM signal and the V-phase PWM signal, becomes a low level. In the example shown in FIG. 5, the detection signal UV becomes a low level when the motor rotation angle is between 25 degrees and 35 degrees. On the other hand, the detection signals VW and WU output by the rectangular pulse comparison circuit 15 include pulses whose high level periods are significantly longer than that of the detection signal UV.

In the fault detection circuit 1 according to the first embodiment, the detection signal shown in FIG. 5 is smoothed by the filter circuit 16, so that a detection signal which becomes a low level during a period when there is no pulse and which becomes a high level during a period when the duty ratio becomes greater than or equal to a predetermined value (e.g., 20%) is given to the fault diagnosis unit 23. Next, the fault diagnosis unit 23 diagnoses a fault in the inverter 11 according to whether or not the combination of the high level and low level of the plurality of detection signals matches a preset determination value. Here, the determination value DV used in the fault diagnosis unit 23 will be described.

FIG. 6 shows a table describing the determination value DV applied to the fault diagnosis unit 23 according to the first embodiment. As shown in FIG. 6, the determination value DV is different for each motor rotation angle in which the alternating-current signals are assumed to be the same voltage in advance. More specifically, the determination value DV when the motor rotation angles, at which the U-phase alternating-current signal and the V-phase alternating-current signal are at the same voltage, are 30 degrees and 210 degrees is defined as normal if the monitor signal UVm, which is a result of comparing the U-phase PWM signal with the V-phase PWM signal, is at a low level, and abnormal if it is at a high level. The determination value DV when the motor rotation angles, at which the V-phase alternating-current signal and the W-phase alternating-current signal are at the same voltage, are 90 degrees and 270 degrees is defined as normal if the monitor signal VWm, which is the result of comparing the V-phase PWM signal with the W-phase PWM signal, is at a low level, whereas if the monitor signal VWm is at a high level, the determination value DV is defined as abnormal. The determination value DV when the motor rotation angles, at which the W-phase alternating-current signal and the U-phase alternating-current signal are at the same voltage, are 150 degrees and 330 degrees is defined as normal if the monitor signal WUm, which is the result of comparing the W-phase PWM signal with the U-phase PWM signal, is at a low level, whereas if the monitor signal WUm is at a high level, the determination value DV is defined as abnormal. Note that the determination value DV in the blank in FIG. 6 means that it is a monitor signal that is not subject to the evaluation.

Figure 7:
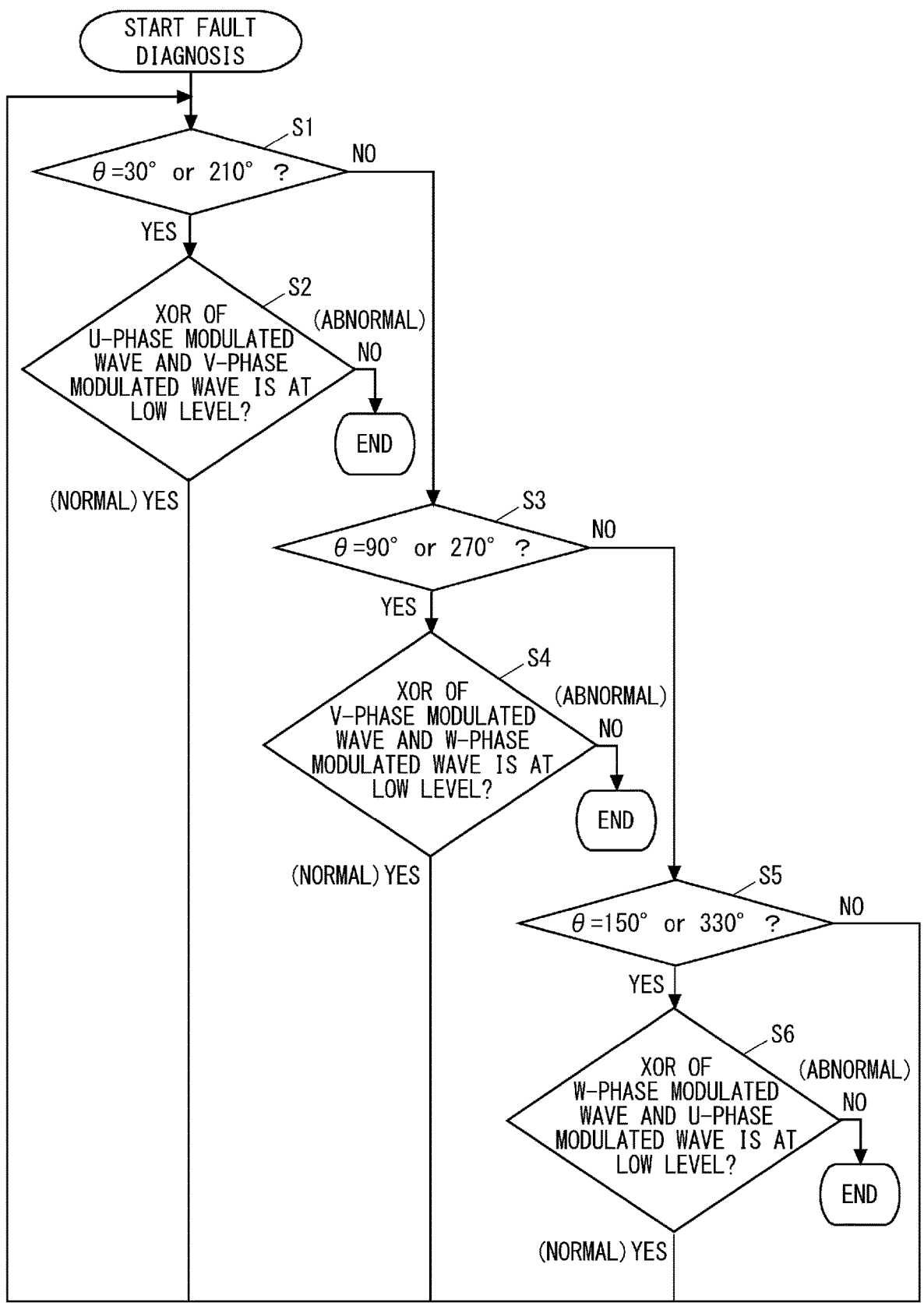
FIG. 7 is a timing chart describing an operation of the fault diagnosis unit according to the first embodiment.

Next, the operation of the fault diagnosis unit 23 will be described in detail. FIG. 7 is a timing chart for describing the operation of the fault diagnosis unit 23 according to the first embodiment. As shown in FIG. 7, the fault diagnosis unit 23 checks a motor rotation angle θ when the operation is started (Steps S1, S3, S5). Next, the fault diagnosis unit 23 executes Step S2 when the motor rotation angle θ becomes 30 degrees or 210 degrees (YES in Step S1), executes Step S4 when the motor rotation angle θ becomes 90 degrees or 270 degrees (YES in Step S3), and executes Step S6 when the motor rotation angle θ becomes 150 degrees or 330 degrees (YES in Step S5).

In Step S2, it is determined whether an exclusive OR value (e.g., detection signal UV) of the U-phase PWM signal and the V-phase PWM signal is at a low level. In Step S2, when the detection signal UV is at a high level, the fault diagnosis unit 23 determines that a fault has occurred in the inverter 11 and terminates the operation. On the other hand, when the detection signal UV is at a low level in Step S2, the fault diagnosis unit 23 continues to monitor the motor rotation angle (Steps S1, S3, S5).

In Step S4, it is determined whether the exclusive OR value (e.g., detection signal VW) of the V-phase PWM signal and the W-phase PWM signal is at a low level. In Step S4, when the detection signal VW is at a high level, the fault diagnosis unit 23 determines that a fault has occurred in the inverter 11 and terminates the operation. On the other hand, when the detection signal VW is at a low level in Step S4, the fault diagnosis unit 23 continues to monitor the motor rotation angle (Steps S1, S3, S5).

In Step S6, it is determined whether the exclusive OR value (e.g., detection signal WU) of the W-phase PWM signal and the U-phase PWM signal is at a low level. In Step S6, when the detection signal WU is at a high level, the fault diagnosis unit 23 determines that a fault has occurred in the inverter 11 and terminates the operation. On the other hand, when the detection signal UV is at a low level in Step S6, the fault diagnosis unit 23 continues to monitor the motor rotation angle (Steps S1, S3, S5).

The fault diagnosis unit 23 repeats the processing of Steps S1 to S6 at a predetermined cycle until an abnormality is detected in the inverter 11. In the fault detection circuit 1, the detection signal (more specifically, monitor signals UVm, VWm, and WUm) used by the fault diagnosis unit 23 to determine whether or not there is a fault in the inverter 11 is generated by an asynchronous circuit, enabling the operation regardless of the computational capability of the MCU 10.

Fault modes of the inverter 11 that can be detected by the fault detection circuit 1 are described here. Four fault modes that can be detected by the fault detection circuit 1 are described below.

Figure 8:
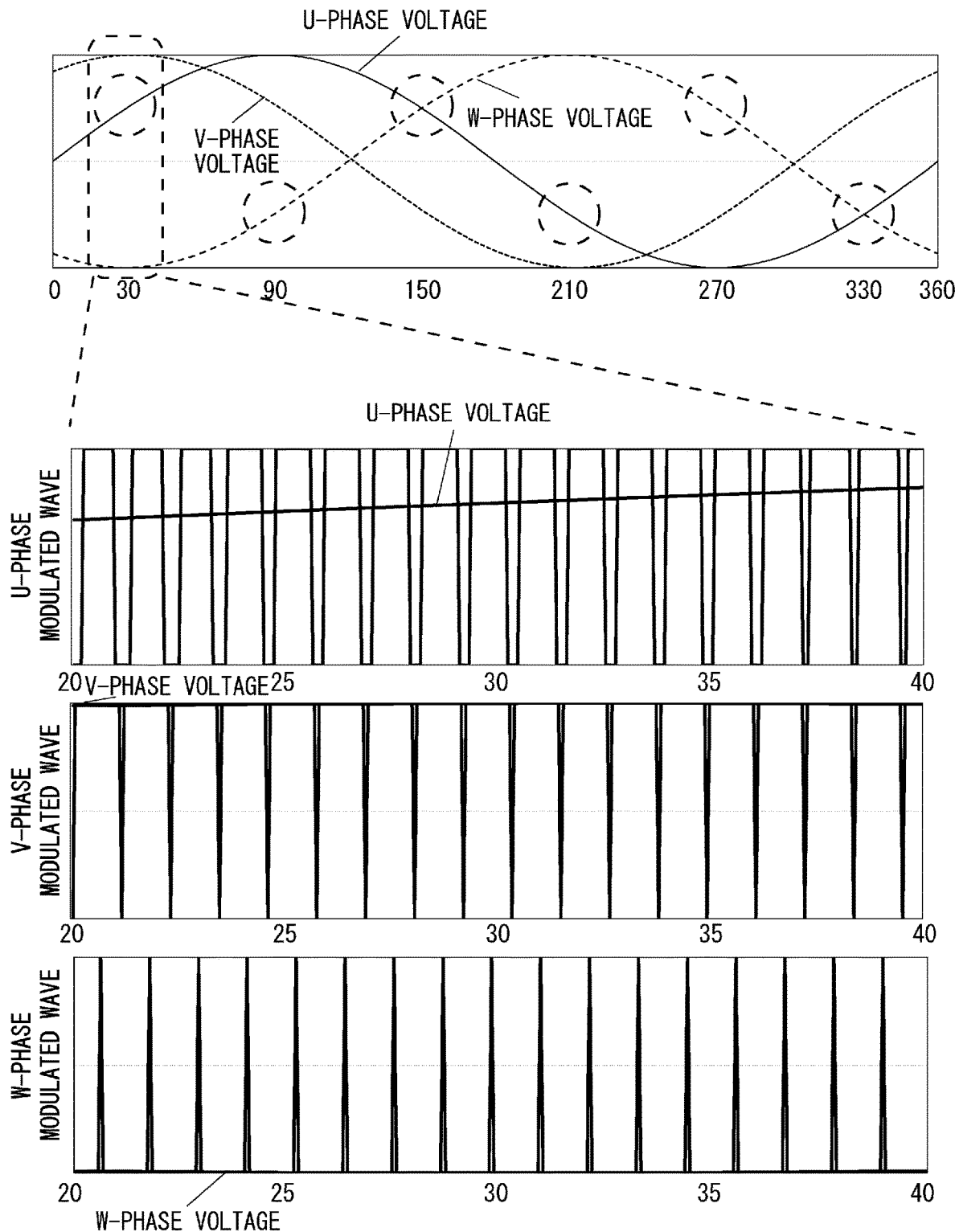
FIG. 8 is a timing chart of a modulated wave output by the inverter when a phase shift fault occurs in a V-phase of a three-phase alternating-current signal.

First, an abnormal state in which a phase shift occurs in the V-phase alternating-current signal among the three-phase alternating-current signals is described as a first fault mode. FIG. 8 is the timing chart of a modulated wave output by the inverter 11 when a phase shift fault occurs in the V-phase alternating-current signal among the three-phase alternating-current signals. In the example shown in FIG. 8, the phase of the V-phase alternating-current signal is delayed by 180 degrees from that in the normal state shown in FIG. 4. When this V-phase alternating-current signal is delayed, a voltage of the V-phase alternating-current signal is shifted from a voltage of the U-phase alternating current signal around the motor rotation angle of 30 degrees. Also, the V-phase alternating-current signal around the motor rotation angle of 30 degrees has a voltage value near the highest voltage on the high voltage side. Therefore, in the example shown in FIG. 8, the duty ratio of the V-phase PWM signal is higher than that of the U-phase PWM signal.

Figure 9:
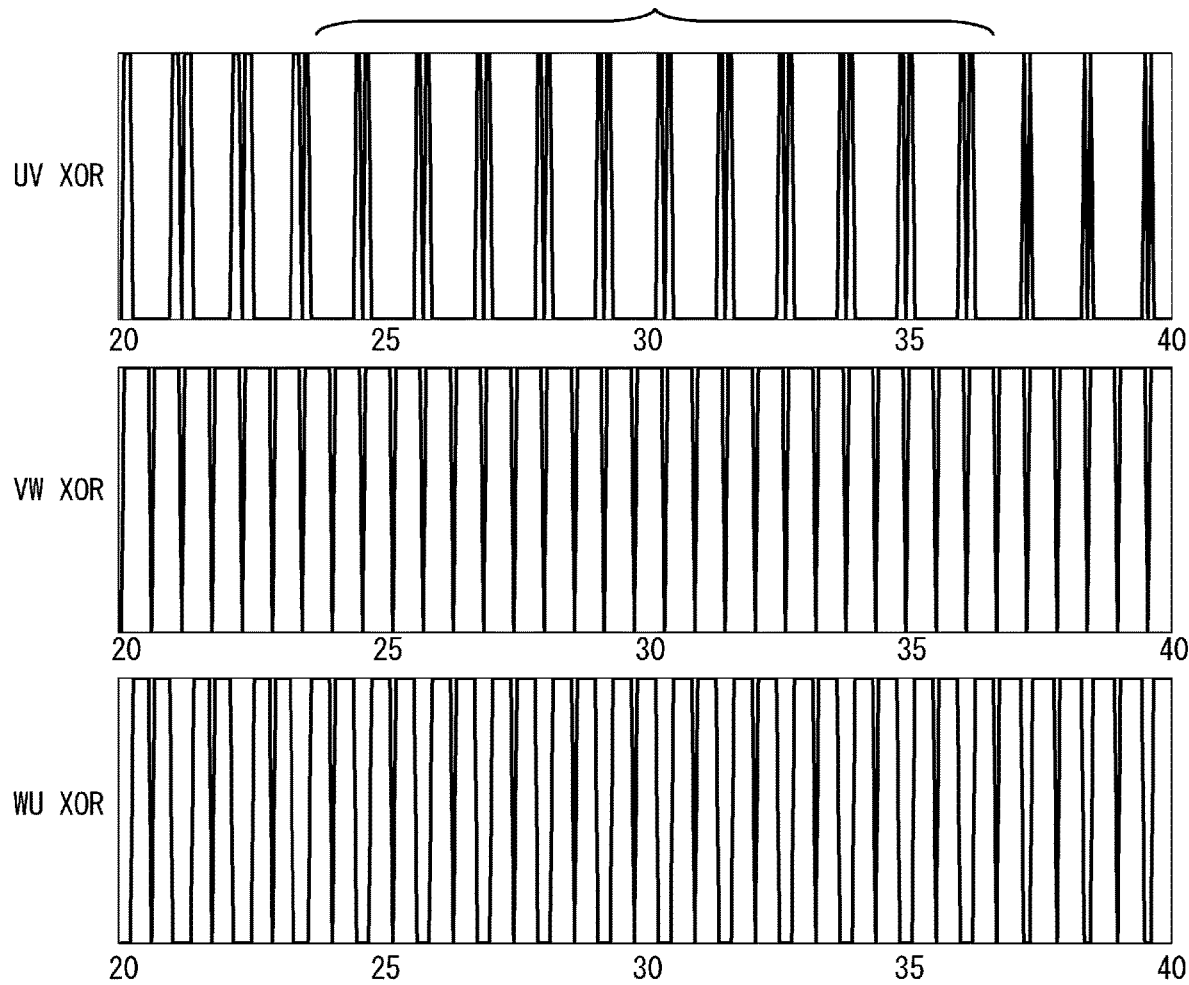
FIG. 9 is a timing chart describing the operation of the rectangular pulse comparison circuit when a phase shift fault occurs in a V-phase of a three-phase alternating-current signal.

Next, FIG. 9 is a timing chart describing an operation of the rectangular pulse comparison circuit 15 when a phase shift fault occurs in the V-phase alternating-current signal among the three-phase alternating-current signals. FIG. 9 is a timing chart of a detection signal output by the rectangular pulse comparison circuit 15 to which the PWM signal shown in FIG. 8 is input when the motor rotation angle is around 30 degrees. As shown in FIG. 9, when a phase shift as shown in FIG. 8 occurs, the detection signal UV with the motor rotation angle around 30 degrees includes a pulse and does not become a low level. Therefore, when the phase shift shown in FIGS. 8 and 9 occurs, the fault detection circuit 1 determines that an abnormality has occurred in the inverter 11 by referring to the determination value DV.

Figure 10:
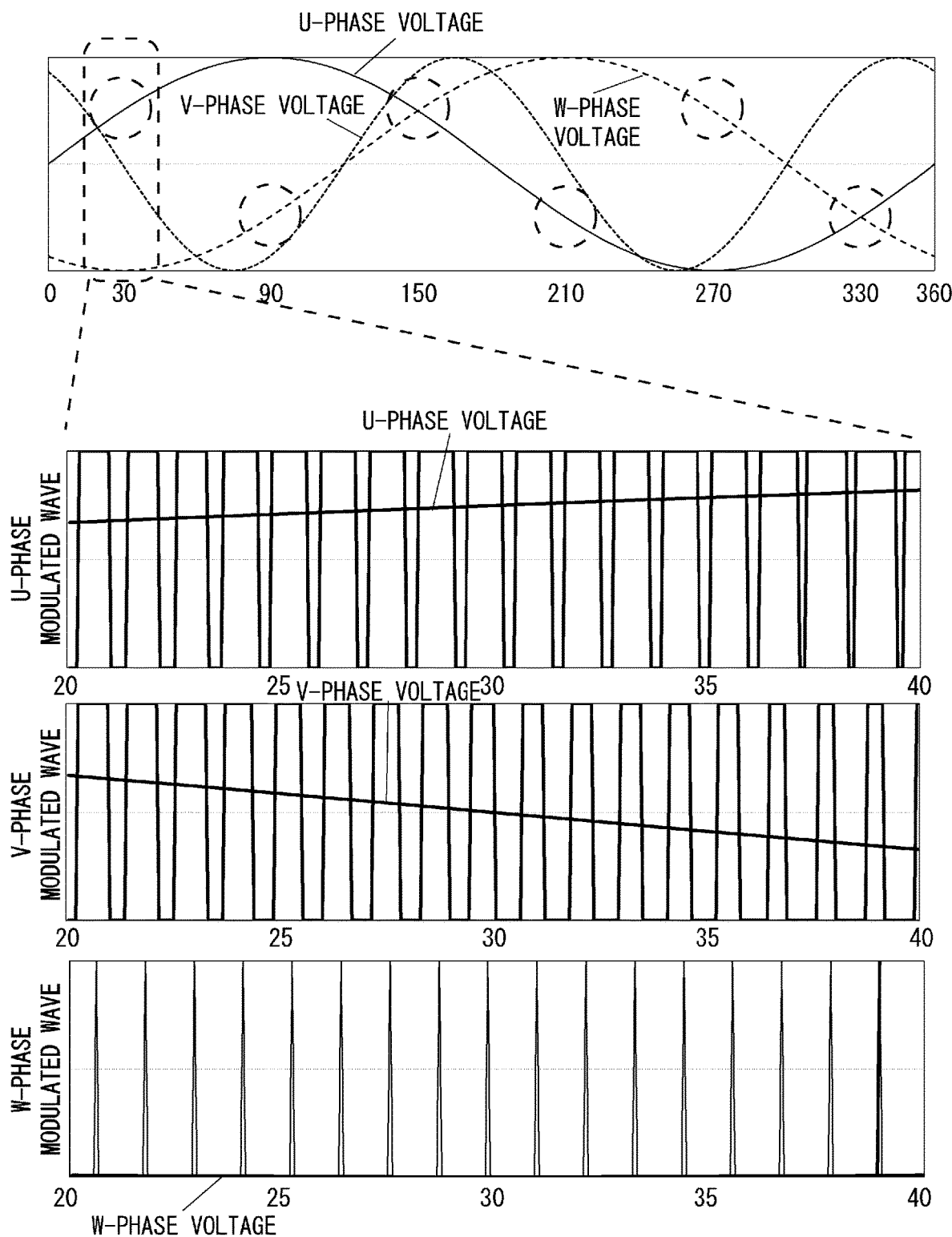
FIG. 10 is a timing chart of a modulated wave output by the inverter in the event of a fault that causes a frequency of a V-phase of a three-phase alternating-current signal to increase.

Next, an abnormal state in which a frequency of the V-phase alternating current signal increases among the three-phase alternating-current signals is described as a second fault mode. FIG. 10 is a timing chart of a modulated wave output by the inverter 11 in the event of a fault that causes the frequency of the V-phase of the three-phase alternating-current signal to increase. In the example shown in FIG. 10, the frequency of the V-phase alternating-current signal is about two times higher than that in the normal state shown in FIG. 4. With such an increased frequency of the V-phase, the voltage of the V-phase alternating-current signal is shifted from that of the U-phase alternating-current signal when the motor rotation angle is around 30 degrees. Specifically, in FIG. 10, the voltage of the V-phase alternating-current signal is lower than that of the U-phase alternating-current signal when the motor rotation angle is around 30 degrees. Therefore, in the example shown in FIG. 10, the duty ratio of the V-phase PWM signal is lower than that of the U-phase PWM signal.

Figure 11:
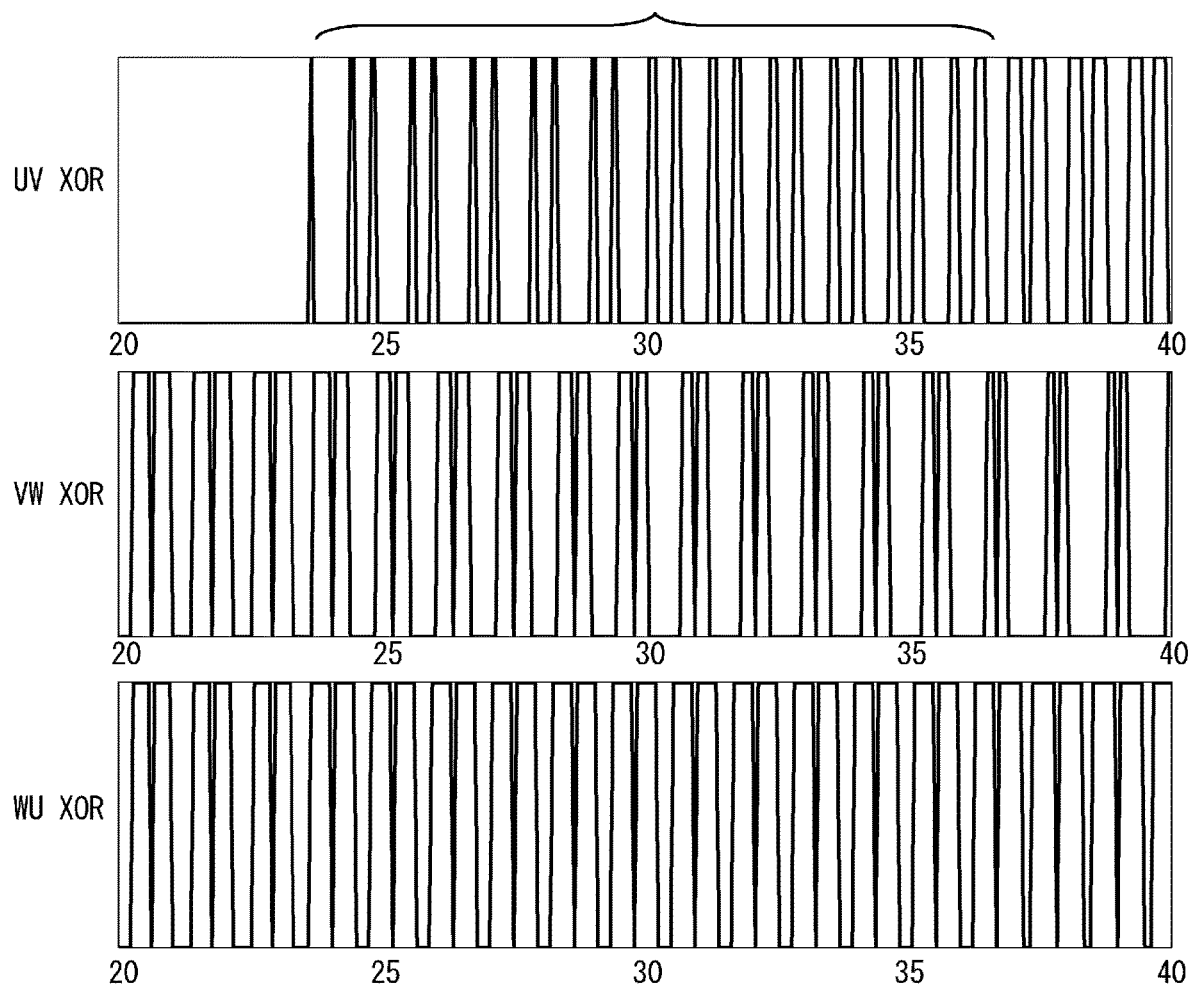
FIG. 11 is a timing chart describing an operation of the rectangular pulse comparison circuit in the event of a fault that causes a frequency of a V-phase of a three-phase alternating-current signal to increase.

Next, FIG. 11 is a timing chart describing an operation of the rectangular pulse comparison circuit 15 in the event of a fault that causes the frequency of the V-phase of the three-phase alternating-current signal to increase. FIG. 11 is a timing chart of a detection signal output by the rectangular pulse comparison circuit 15 to which the PWM signal shown in FIG. 10 is input when the motor rotation angle is around 30 degrees. As shown in FIG. 11, when the frequency is shifted to the high frequency side as shown in FIG. 10, the detection signal UV with the motor rotation angle around 30 degrees includes a pulse and does not become a low level. Therefore, when the frequency shift shown in FIGS. 10 and 11 occurs, the fault detection circuit 1 determines that an abnormality has occurred in the inverter 11 by referring to the determination value DV.

Figure 12:
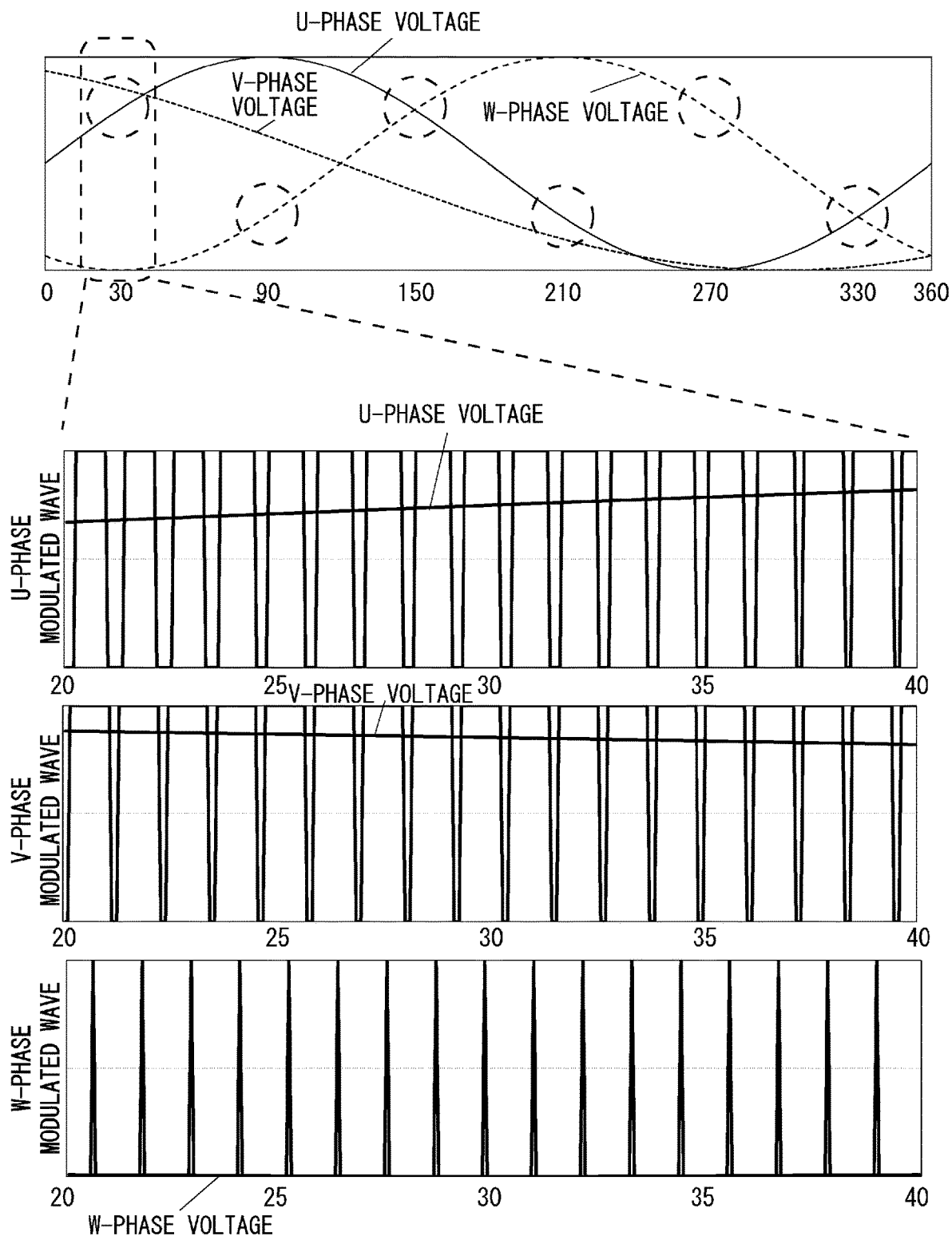
FIG. 12 is a timing chart describing a modulated wave output by the inverter in the event of a fault that causes a frequency of a V-phase of a three-phase alternating-current signal to be lowered.

Next, an abnormal state in which the frequency of the V-phase alternating-current signal is lowered among the three-phase alternating-current signals is described as a third fault mode. FIG. 12 is a timing chart of a modulated wave output by the inverter 11 in the event of a fault that causes the frequency of the V-phase of the three-phase alternating-current signal to be lowered. In the example shown in FIG. 12, the frequency of the V-phase alternating-current signal is lowered by about ½ than that in the normal state shown in FIG. 4. With such a lowered frequency of the V-phase, the voltage of the V-phase alternating-current signal is shifted from that of the U-phase alternating-current signal when the motor rotation angle is around 30 degrees. Specifically, in FIG. 12, the voltage of the V-phase alternating-current signal is higher than that of the U-phase alternating-current signal when the motor rotation angle is around 30 degrees. Therefore, in the example shown in FIG. 12, the duty ratio of the V-phase PWM signal is higher than that of the U-phase PWM signal.

Figure 13:
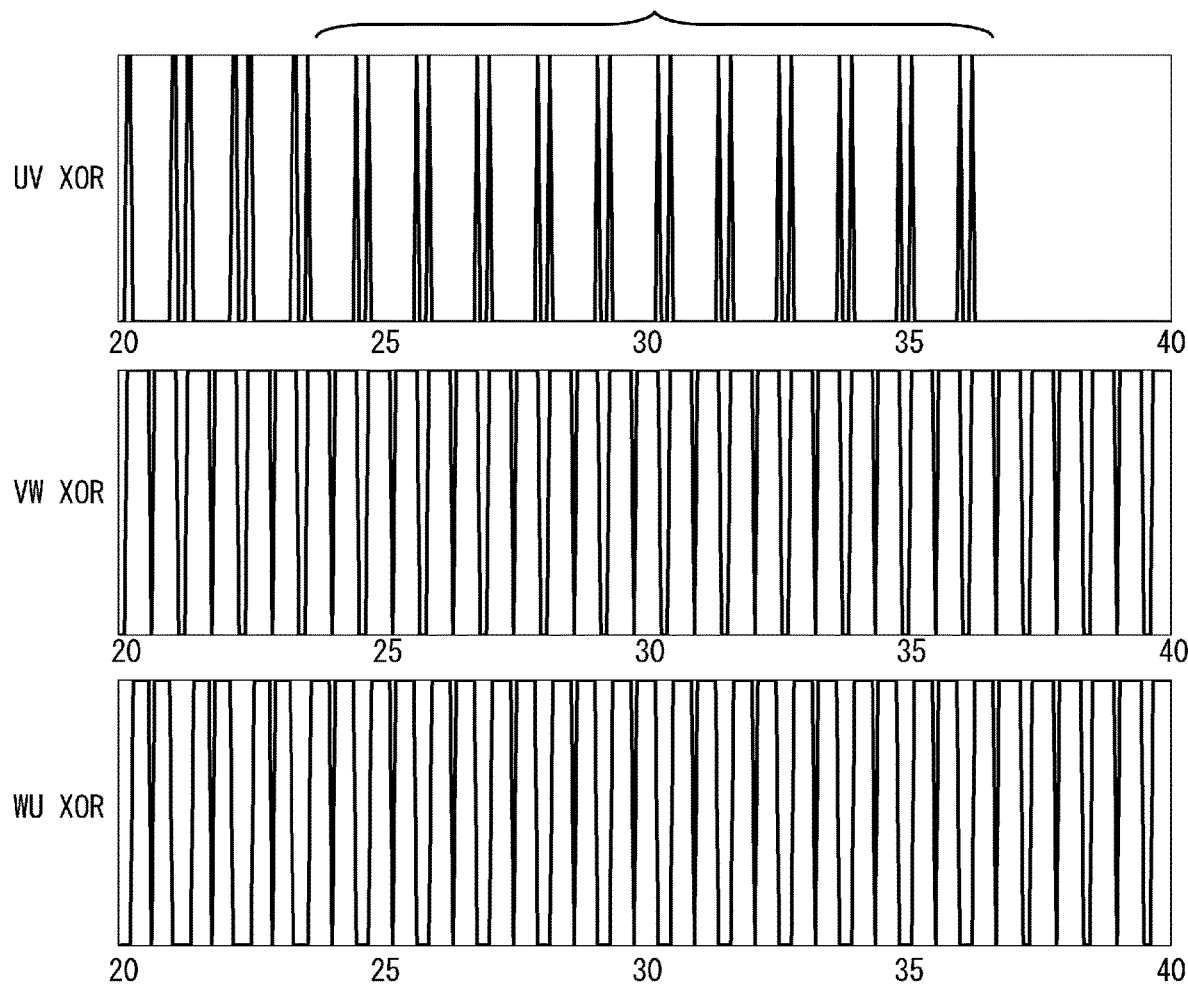
FIG. 13 is a timing chart describing an operation of the rectangular pulse comparison circuit in the event of a fault that causes a frequency of a V-phase of a three-phase alternating-current signal to be lowered.

Next, FIG. 13 is a timing chart describing an operation of the rectangular pulse comparison circuit 15 in the event of a fault that causes the frequency of the V-phase of the three-phase alternating-current signal to be lowered. FIG. 13 is a timing chart of a detection signal output by the rectangular pulse comparison circuit 15 to which the PWM signal shown in FIG. 12 is input when the motor rotation angle is around 30 degrees. As shown in FIG. 13, when the frequency is shifted to the high frequency side as shown in FIG. 12, the detection signal UV with the motor rotation angle around 30 degrees includes a pulse and does not become a low level. Therefore, when the frequency shift shown in FIGS. 12 and 13 occurs, the fault detection circuit 1 determines that an abnormality has occurred in the inverter 11 by referring to the determination value DV.

Figure 14:
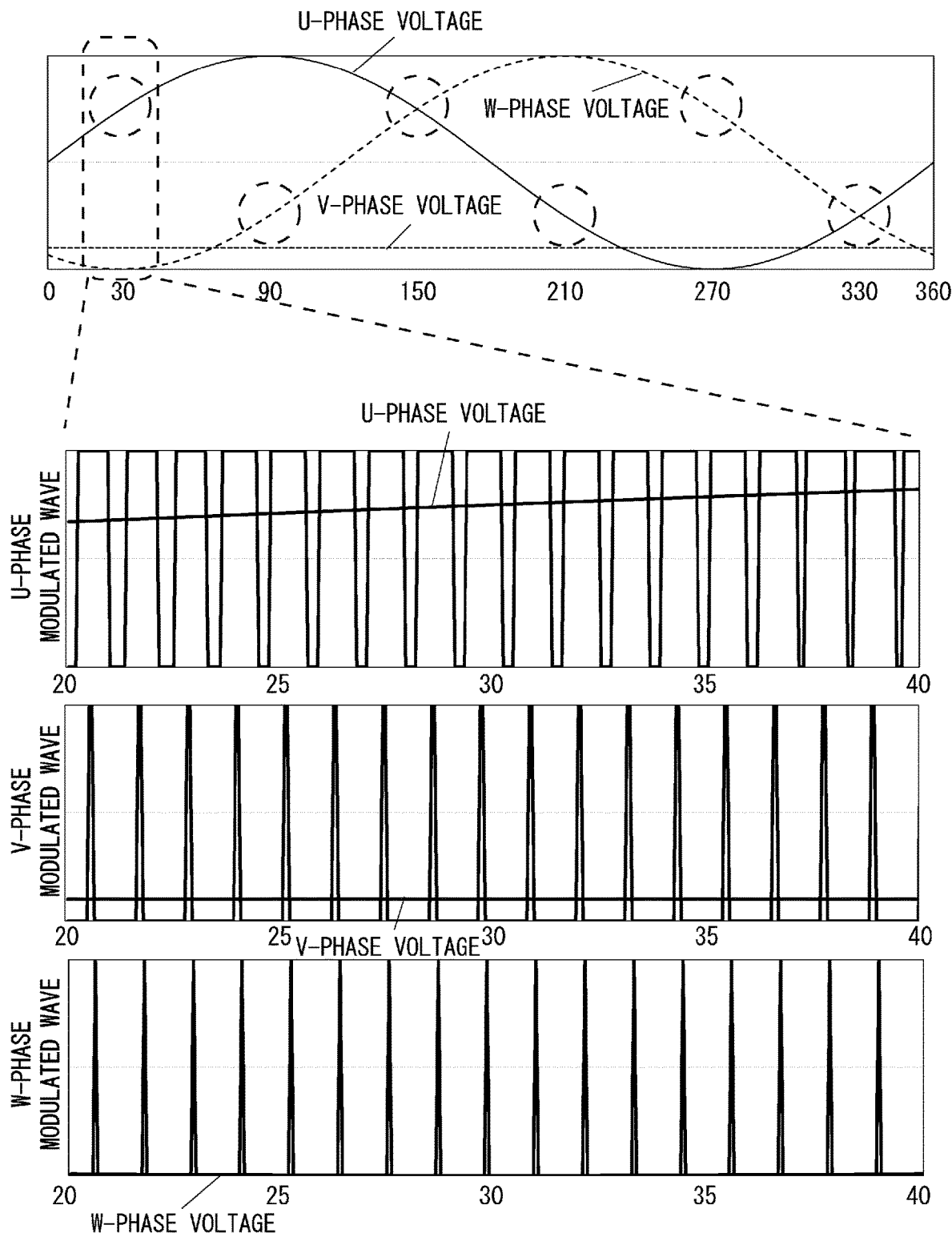
FIG. 14 is a timing chart of a modulated wave output by the inverter in the event of a fault that causes a V-phase of a three-phase alternating-current signal to stick to a low side.

Next, an abnormal state in which the frequency of the V-phase alternating-current signal sticks to the low side among the three-phase alternating-current signals is described as a fourth fault mode. FIG. 14 is a timing chart of a modulated wave output by the inverter 11 in the event of a fault that causes the V-phase alternating-current signal among the three-phase alternating-current signal to stick to the lower side. In the example shown in FIG. 14, the V-phase alternating-current signal, which is originally a sine wave, remains stuck to the low side as shown in FIG. 4. When the V-phase voltage sticks to the low level in this way, the voltage of the V-phase alternating-current signal is shifted from that of the U-phase alternating-current signal around the motor rotation angle of 30 degrees. Specifically, in FIG. 14, the voltage of the V-phase alternating-current signal is lower than that of the U-phase alternating-current signal when the motor rotation angle is around 30 degrees. Therefore, in the example shown in FIG. 14, the duty ratio of the V-phase PWM signal is lower than that of the U-phase PWM signal.

Figure 15:
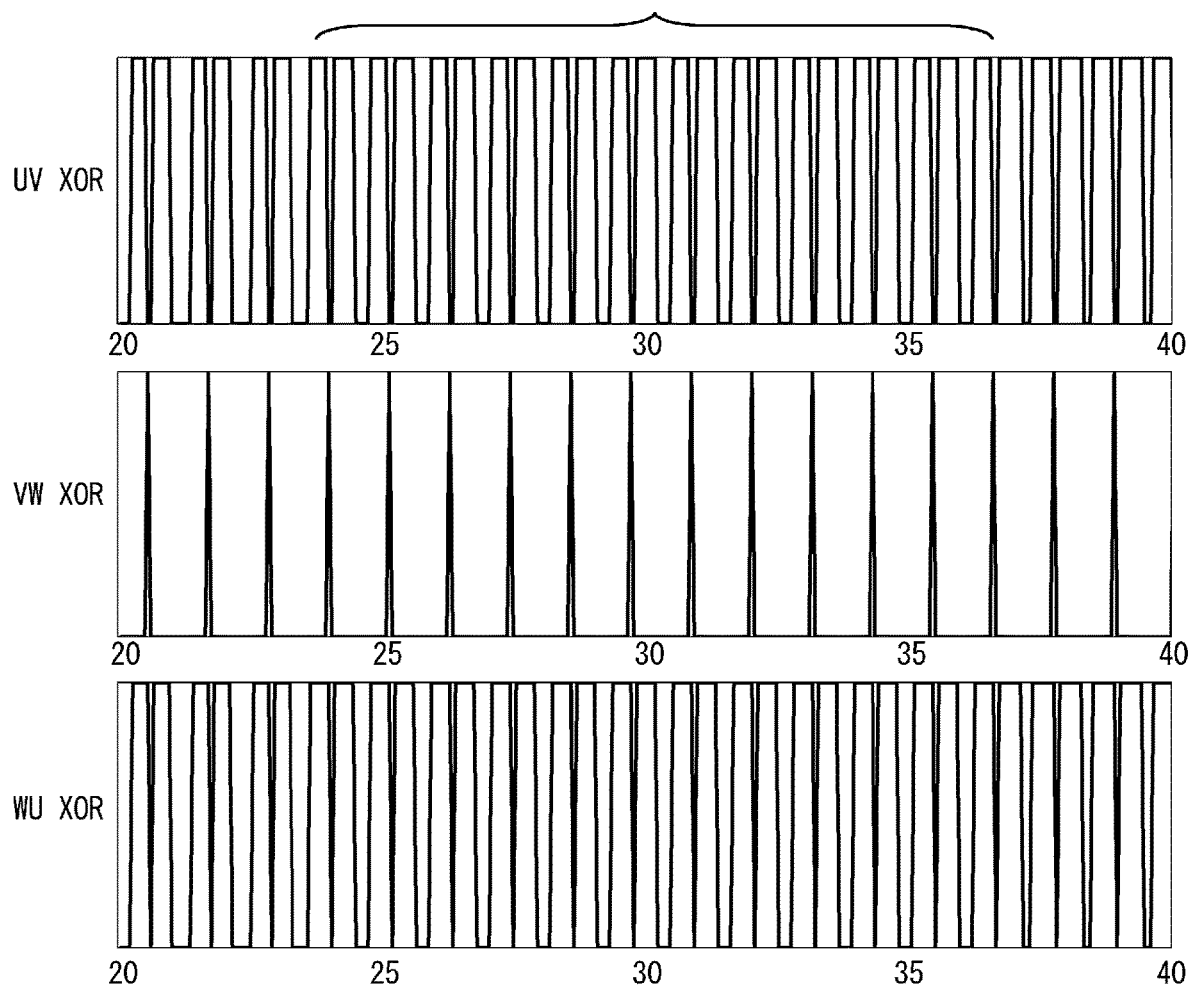
FIG. 15 is a timing chart describing an operation of the rectangular pulse comparison circuit in the event of a fault in which a V-phase of a three-phase alternating-current signal sticks to the low side.

Next, FIG. 15 is a timing chart describing an operation of the rectangular pulse comparison circuit 15 in the event of a fault in which the V-phase alternating-current signal among the three-phase alternating-current signals sticks to the low side. FIG. 15 is a timing chart of a detection signal output by the rectangular pulse comparison circuit 15 to which the PWM signal shown in FIG. 14 is input when the motor rotation angle is around 30 degrees. As shown in FIG. 15, when the V-phase alternating-current signal as shown in FIG. 14 sticks to the low side, the detection signal UV with the motor rotation angle around 30 degrees includes a pulse and does not become a low level. Therefore, when a failure of the alternating-current signal sticking to the low side as shown in FIGS. 14 and 15 occurs, the fault detection circuit 1 determines that an abnormality has occurred in the inverter 11 by referring to the determination value DV.

Based on the above description, in the fault detection circuit 1 according to the first embodiment, the pulse widths of the PWM signals, which are to be three-phase alternating-current signals whose phases are adjacent to each other are compared with each other by the rectangular pulse comparison circuit 15, and a detection signal indicating a difference component between the pulse widths is generated. Next, in the fault detection circuit 1 according to the first embodiment, a fault in the inverter 11 is determined by verifying a magnitude of the difference component of the input detection signal with reference to the determination value DV set for each motor rotation angle where the difference component between the pulse widths would disappear under normal operation. At this time, in the fault detection circuit 1 according to the first embodiment, since the detection signal including the difference component between the pulse widths of the PWM signals is generated by an asynchronous circuit, the MCU10 does not need high computational capability to generate the detection signal. Thus, in the fault detection circuit 1 according to the first embodiment, an abnormality in the inverter can be detected by an arithmetic unit with low processing power (e.g., the MCU10), and the power consumption of the MCU10 can be reduced.

Furthermore, in the fault detection circuit 1 according to the first embodiment, a detection signal output by the rectangular pulse comparison circuit 15 can be smoothed by the filter circuit 16, so that the consumption of the processing power of the MCU10 can be further suppressed by giving the detection signal to the MCU 10 as a monitor signal which is substantially a DC signal.

Also, in the fault detection circuit 1 according to the first embodiment, the fault diagnosis unit 23 changes the determination value DV to be applied based on the motor rotation angle, but the motor rotation angle is information used by the motor control unit 20 for the control of the motor 12, and it is not necessary to add another new circuit to acquire the motor rotation angle.

Second Embodiment

In a second embodiment, a rectangular pulse comparison circuit 15a, which is another form of the rectangular pulse comparison circuit 15, will be described. In the description of the second embodiment, the same components as those described in the first embodiment are assigned the same symbols as those in the first embodiment, and the description thereof is omitted.

Figure 16:
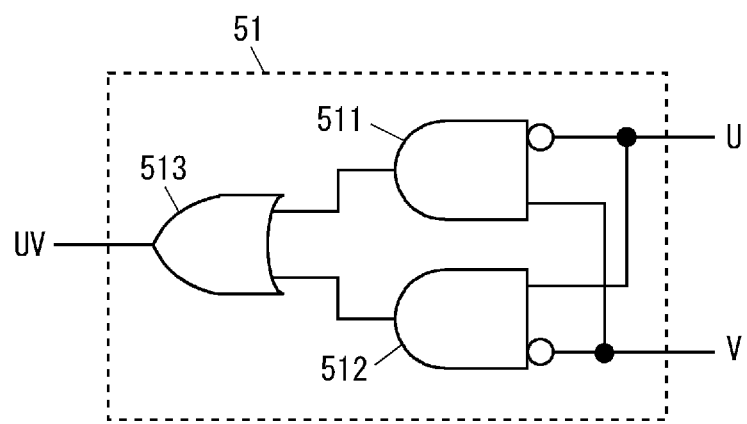
FIG. 16 is a circuit diagram of the rectangular pulse comparison circuit according to a second embodiment.
Figure 16:
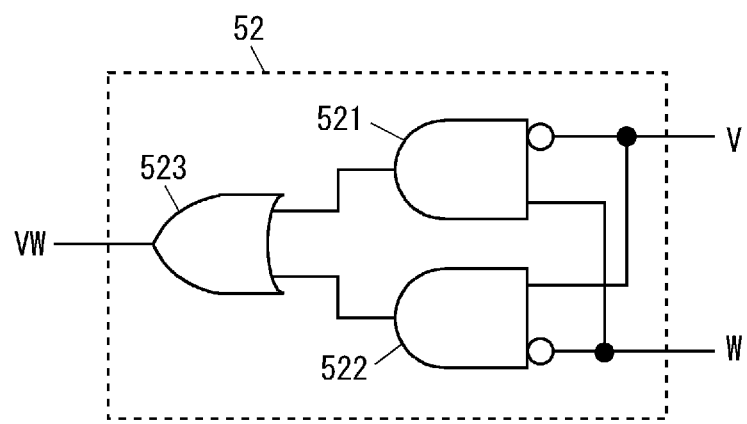
Figure 16:
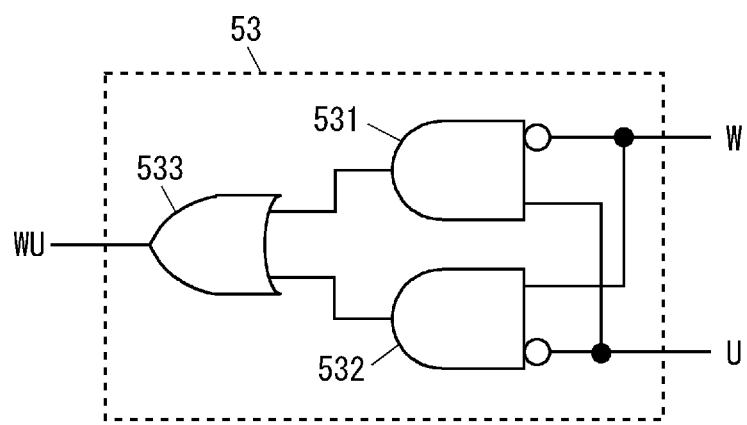

FIG. 16 is a circuit diagram of the rectangular pulse comparison circuit 15a according to the second embodiment. As shown in FIG. 16, the rectangular pulse comparison circuit 15a has pulse width difference extraction circuits 51 to 53. The pulse width difference extraction circuits 51 to 53 perform the same operation as those of the exclusive OR circuits 31 to 33, but the circuits of the pulse width difference extraction circuits 51 to 53 are different from the exclusive OR circuits 31 to 33. The pulse width difference extraction circuit 51 outputs a pulse width difference component between the U-phase PWM signal and the V-phase PWM signal as the detection signal UV. The pulse width difference extraction circuit 52 outputs a pulse width difference component between the V-phase PWM signal and the W-phase PWM signal as the detection signal VW. The pulse width difference extraction circuit 53 outputs the pulse width difference component between the W-phase PWM signal and the U-phase PWM signal as the detection signal WU.

Since the pulse width difference extraction circuits 51 to 53 have the same circuit configuration and different inputs and outputs, the circuit configuration of the pulse width difference extraction circuit will be described using the pulse width difference extraction circuit 51 as an example. The pulse width difference extraction circuit 51 has AND circuits 511 and 512 and an OR circuit 513. The AND circuit 511 outputs a logical product of an inverted logic of the U-phase PWM signal and the V-phase PWM signal. The AND circuit 512 outputs a logical product of the U-phase PWM signal and an inverted logic of the V-phase PWM signal. The OR circuit 513 outputs a logical product of an output of the AND circuit 511 and an output of the AND circuit 512 as the detection signal UV.

Thus, if the same logical operation result can be output as that of the exclusive OR circuit, it is also possible to configure a rectangular pulse comparison circuit with a circuit configuration other than the exclusive OR circuit.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A fault detection circuit for detecting a fault in an inverter that outputs a three-phase pulse width modulated signal that becomes a three-phase alternating-current signal for driving a motor, the fault detection circuit comprising:
a rectangular pulse comparison circuit configured to generate, for each combination of the pulse width modulated signals, a detection signal indicating a difference component between pulse widths of two of the pulse width modulated signals having phases adjacent to each other;
a fault diagnosis unit configured to detect a fault in the inverter based on a shift in a combination of logic levels of a plurality of the detection signals output by the rectangular pulse comparison circuit from a preset determination value, wherein
the fault diagnosis unit uses the preset determination value that is different for each motor rotation angle assuming in advance that two alternating-current signals having phases adjacent to each other among the three-phase alternating-current signals have the same voltage; and
a rotation angle acquisition unit configured to acquire the motor rotation angle from an angle sensor for detecting the motor rotation angle and transmit the acquired motor rotation angle to the fault diagnosis unit.

2. The fault detection circuit according to claim 1, further comprising a filter circuit between the rectangular pulse comparison circuit and the fault diagnosis unit configured to smooth each of the plurality of detection signals, wherein
the fault diagnosis unit detects the fault in the inverter based on the logic level of the smoothed detection signal.

3. The fault detection circuit according to claim 1, wherein the rectangular pulse comparison circuit comprises an exclusive OR circuit for each combination of the pulse width modulation signals to be compared with each other, and the plurality of exclusive OR circuits each output a result of an exclusive OR operation of the two pulse width modulation signals as the detection signal.

4. The fault detection circuit according to claim 1, wherein the plurality of pulse width modulation signals have the same frequency and phase and have a pulse width change pattern in accordance with a phase of a corresponding alternating-current signal.

* * * * *